United States Patent [19]
Sciaky

[11] 3,735,089
[45] May 22, 1973

[54] MULTIPLE ELECTRODE RESISTANCE WELDING MACHINE

[75] Inventor: David Sciaky, Chicago, Ill.
[73] Assignee: Welding Research, Inc., Chicago, Ill.
[22] Filed: Nov. 5, 1971
[21] Appl. No.: 196,030

[52] U.S. Cl. ...................219/87, 219/88, 219/116, 307/148
[51] Int. Cl. ................................................B23k 9/28
[58] Field of Search....................219/87, 88, 89, 108, 219/116, 119; 336/171, 175; 307/147, 148; 13/9, 12

[56] References Cited
UNITED STATES PATENTS

| | | | |
|---|---|---|---|
| 1,012,934 | 12/1911 | Thomson | 219/87 |
| 3,125,668 | 3/1964 | Eisenburger | 219/87 |
| 3,424,888 | 1/1968 | Sommebegger et al. | 219/87 |
| 3,042,849 | 7/1962 | Dortort | 336/175 X |
| 2,521,513 | 9/1950 | Gray | 336/223 X |

*Primary Examiner*—T. J. Kozma
*Assistant Examiner*—B. A. Reynolds
*Attorney*—Julius L. Solomon

[57] ABSTRACT

The subject of this invention is a multiple electrode resistance welding machine in which, by a particular configuration of the conductors which connect the power supply to the several welding positions, the DC resistance and the inductance of the circuit between the power supply and each of the welding guns is made constant. Through the use of the novel arrangement of secondary circuit conductors, the total resistance and the inductors in all of the circuits is the same so that the welding current and wave shape is the same in all of the secondary gun circuits and the weld quality at all of the welding points is uniform.

6 Claims, 5 Drawing Figures

PRIOR ART

PATENTED MAY 22 1973 3,735,089

INVENTOR.
DAVID SCIAKY
BY Julius L. Solomon

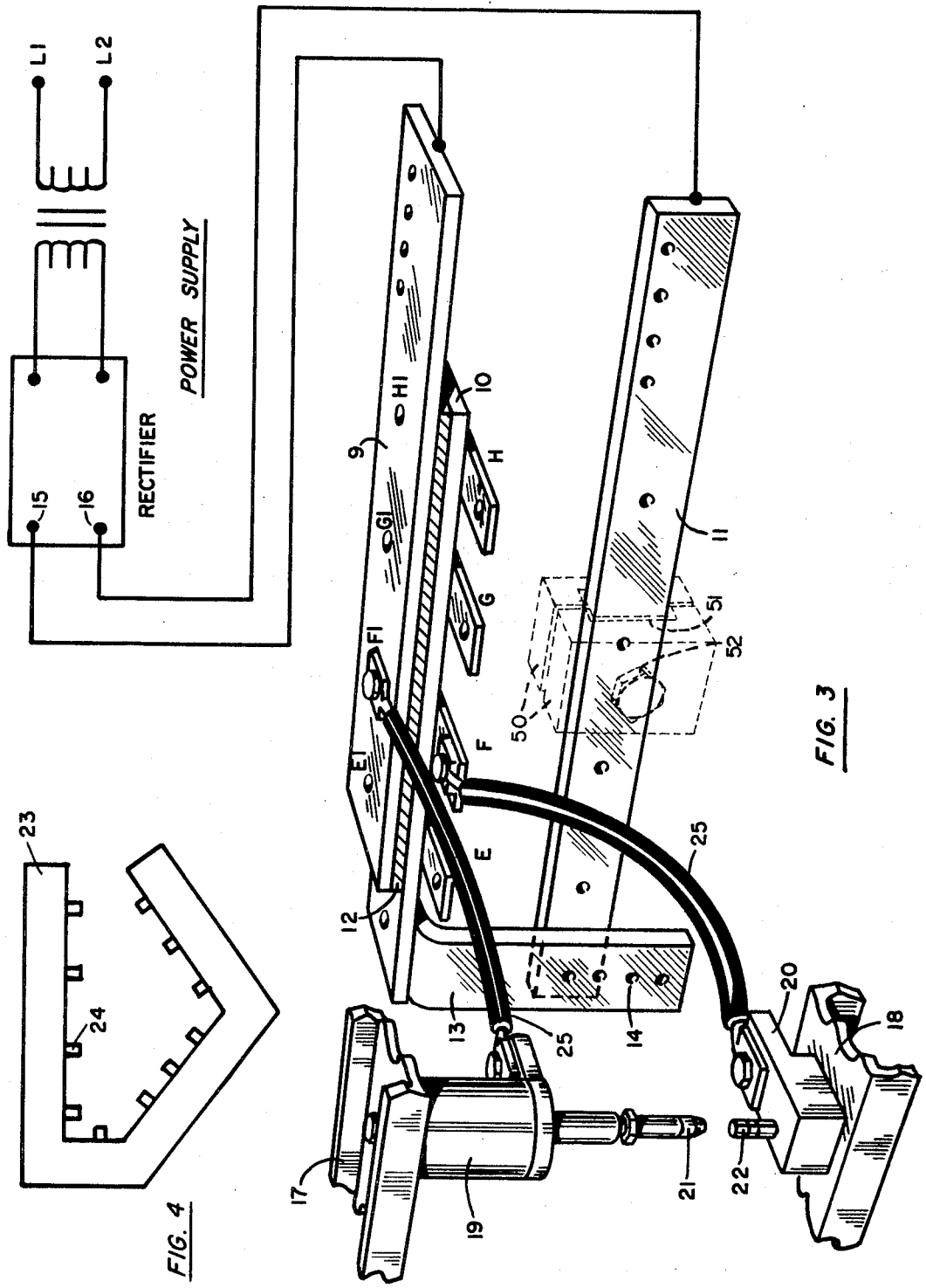

PATENTED MAY 22 1973

INVENTOR.
DAVID SCIAKY

BY Julius L. Solomon

MULTIPLE ELECTRODE RESISTANCE WELDING MACHINE

This invention refers to resistance welding machines and, in particular, to resistance welding machines of the multiple gun type in which a single power source is utilized to feed several welding guns which are operated simultaneously to produce a multiplicity of welds at one time. In the resistance welding process a current of high amperage is caused to pass across the faying surfaces of two overlapped sheets which are to be welded. Welding electrodes which are oriented along a common axis — one on each side of the sheets to be welded — are caused to apply a suitable force to the two sheets being welded, the welding current being fed from a power supply to the two electrodes for a preset interval of time so that current passes from one terminal of the power supply through one electrode through the two sheets to be welded and returns through the second electrode to the second terminal of the power supply. The power supply is usually a high power transformer whose secondary output voltage is in the neighborhood of 5 to 10 volts and whose primary is fed from the power supply line.

In many industrial applications of resistance welding it is necessary to produce a multiplicity of welds at one time upon a work piece. For example, in the manufacturing of floor pans for automobiles, the work pieces to be welded are installed in a welding machine which incorporates a multiplicity of welding electrodes and several parts are attached by resistance welding to the floor pan at one time by the application of current through the parts to be welded. Machines of this type usually incorporate several transformers each of which feeds one or at most two welding guns placed adjacent to each other. Attempts have been made to utilize a single transformer connected to a multiplicity of welding electrodes distributed at the different points on the welding machine but is has been found that due to the differences in length between the welding transformer and each individual gun the welding current is not uniform so that welding results are not satisfactory at all points where welds are to be made, therefore it is necessary to utilize separate transformers with means for adjusting the secondary voltage to a value which depends upon the configuration of the secondary circuit for the particular sets of electrodes connected to that transformer. The present invention relates to an apparatus whereby a multiplicity of electrodes may be powered by a single power supply which is caused to deliver equal secondary currents to a multiplicity of electrodes or welding guns no matter where they are positioned with respect to the welding transformer or power supply.

It is the object of this invention to allow the production of resistance welding apparatus, which includes a multiplicity of welding guns to be powered by a single transformer or a direct current power source.

Another object is to allow the control of current through a multiplicity of electrodes to be effected from a single controller.

Another object is to effect a multiple electrode system in which the inductance and resistance in each of the electrode circuits are the same.

Another object is to allow for the production of multiple electrode resistance welders of simplified structure in which the welding currents and wave form are substantially equal for all electrodes.

Another object is to allow for the use of either an A.C. or D.C. power supply for feeding the electrodes.

Another object is to effect a multi-gun resistance welder in which the current delivered to each of the guns is the same although a single power source and a single control system are utilized.

Reference may now be made to the several figures embodied in the specification which illustrate one form of the invention in which, FIGS. 1 and 2 are schematic representations of multi-gun resistance welding systems in the prior art.

FIG. 3 is a schematic representation of a multi-gun resistance welder made in accordance with the teachings of the present invention.

FIG. 4 illustrates an arrangement for making a multiplicity of spot welds at one time in accordance to the present invention around the periphery of a work piece.

Figure 1:
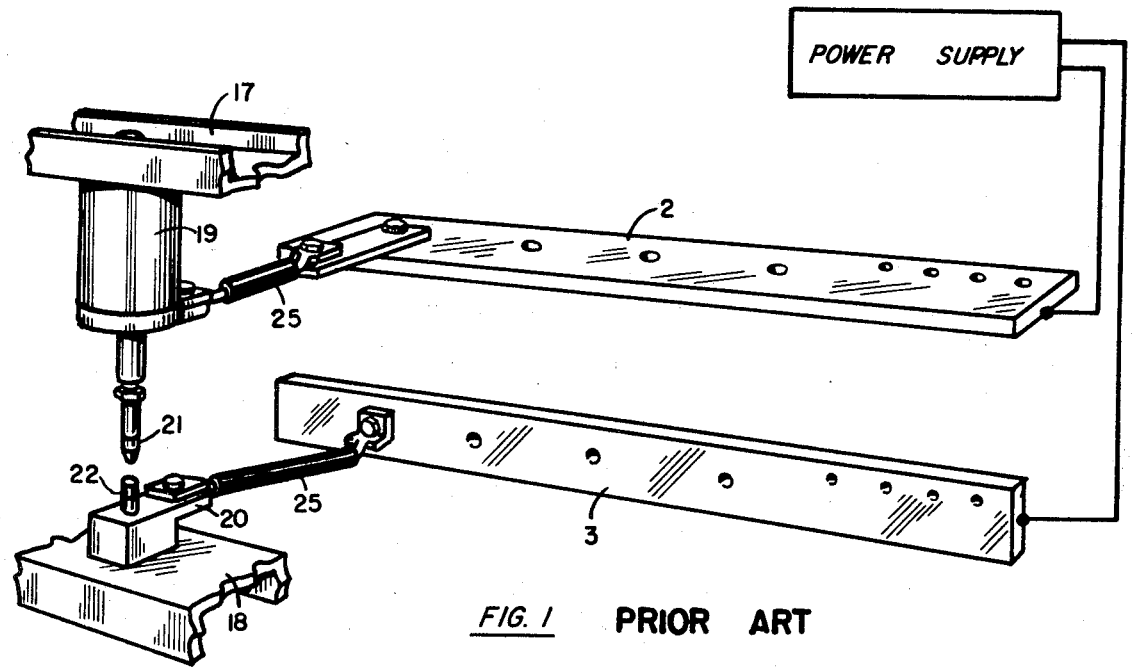

FIG. 1 illustrates a common system utilized for feeding several resistance welding guns from a single power supply. The power supply, a transformer 1, is connected to the center of the bus bar system comprising upper bus bar 2 and lower bus bar 3, the transformer being connected to the center of the length of each bus bar and the welding guns connected to any point along the bus bars, the lower electrode 22 being connected to bus bar 3 through a flexible conductor 25 and the upper electrode 21 carried and moved by the cylinder and piston 19 which supplies the force between the sheets to be welded. The upper electrode holder is connected to any point along bus bar 2 by a flexible conductor 25. In this system, because of the variable resistance between the power supply transformer and the gun, depending upon where the gun is positioned and because of the variable area of the loop in the secondary circuit which depends upon the position at which the gun is fixed, it will be found that the welding results will vary from point to point along the bus bars since the further the distance from the welding transformer to the gun the greater will be the resistance and inductance in the secondary circuit. As the resistance and inductance increase the welding current for a fixed secondary voltage of the transformer will decrease.

Figure 2:
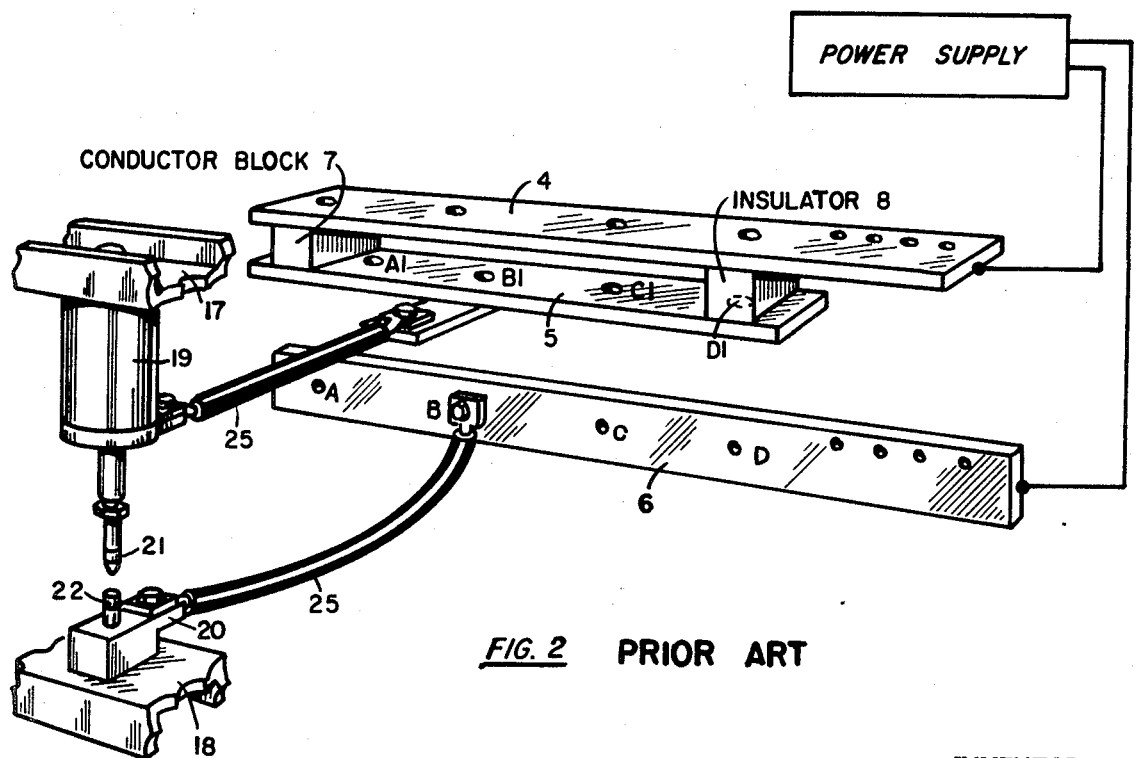

In order to correct the deficiencies of the circuit shown in FIG. 1, the system shown in FIG. 2 was devised. In this system three bus bars, 4, 5 and 6 are utilized in the relative positions as shown, oriented one below the other. The power supply is connected to one end of bus bars 4 and 6, the opposite end of bus bar 4 is connected by conductor block 7 to conductor bar 5 which is also supported close to its opposite end by insulator No. 8. Welding guns are connected by suitably sized conductors to the bus bars 5 and 6, the two electrodes of one gun being connected to points A and A$^1$, respectively, a second gun connected to B and B$^1$, a third between C and C$^1$, and the fourth between D and D$^1$. By following the circuit through each individual gun we may observe that the length of the conducting path is the same for each gun's circuit. For the gun connected between A and A$^1$, the circuit would be from one terminal of the power supply through the bus bar 4 through the conductor block 7, along bus bar 5, between conductor bar 7 and A$^1$, through the cables and the electrodes of the welding gun returning to point A, through the bus bar 6 and back to the second terminal of the power supply. For the gun connected between points D and $D^1$, the circuits would have the same length from one terminal of the power supply through bus bar 4 to conductor block 7, from conductor block 7 to point $D^1$ on conductor bar 5, through the cables and electrodes of the welding gun returning to point D on bus bar 6, from point D to the second terminal of the power supply. The length of each circuit is the same for similar guns and conducting cables. At first glance one might say that if the power supply were a DC source the currents through a gun connected between any of the pair of points $AA^1$, $BB^1$, $CC^1$, and $DD^1$ would be equal. However one finds when utilizing a power supply which delivers a single phase full wave rectified high current to the bus bars 4 and 6 that although the average value of DC current to each gun is the same, the form and shape of the current is not, there being a varying degree of ripple depending upon the position of the gun. For example the gun connected between terminals A and $A^1$ will show a minimum of ripple in its current form, whereas the gun connected between D and $D^1$ would show a high ripple factor. This, it was discovered, was due to the fact that the inductance in the circuit when the gun is connected between D and $D^1$ is much less than the inductance when the gun is connected between the points A and $A^1$. Furthermore, the rise of current to the steady state condition required a longer period for the gun connected between the terminals A and $A^1$. This, of course, would be true whether a source of pure D.C. were used or an unfiltered D.C. derived from the power supply through rectification.

In order to overcome this shortcoming, and to obtain currents through each of the multiplicity of welding guns which are equal in average current and wave form, the system illustrated in FIG. 3, the subject of the present invention, has been devised. In FIG. 3 is shown bus bars 9, 10 and 11. Bus bar 9 is connected to one terminal 15 of the power supply. Bus bar 10 is arranged as shown supported by bus bar 9 but insulated therefrom by a thin insulating sheet 12. The end of bus bar 10 which is furthest from the point of connection of bus bar 9 to the power supply, is connected by conductor 13 to bus bar 11 whose opposite end is connected to terminal 16 of the power supply. Welding guns may be connected between points E and $E^1$ on F and $F^1$, G and $G^1$, H and $H^1$, on bus bars 10 and 9, respectively. For guns connected across any set of these points the total resistance of the circuits will be the same and also the inductance of all gun circuits will be equal. Through the use of the construction in accordance with this invention the current through each of the gun circuits will be alike in amplitude, wave form and rise time of the current to the steady state and therefore the welding results will be alike for each of the gun positions. Furthermore, the rate of rise of current in the secondary circuit may be changed by varying the secondary inductance by the simple expedient of adding iron between or around the common secondary conductors or in the separate secondary circuits of each gun if minor adjustments are required from gun to gun or by changing the distance between bus bars by shifting the connection of bus bar 11 to any one of the holes 14 on conductor 13.

One method for adding iron is illustrated by the broken line structure indicated by 50, 51 and 52 on FIG. 3. The iron parts 50 are attached by bolt 52 to the bus bar 11. Insulation 51 between the conductor 11 and the parts 50 and 51 may be provided to prevent current from flowing through the iron. The iron 50 may be used as shown to form a closed loop around a portion of the conductor, or may be designed to only partially surround the conductor if a lesser increase in in-ductance is desired. If a greater inductance is desired, several of the iron structures shown may be used along the bus bar 11.

FIG. 4 illustrates schematically how the group of bus bars may be arranged around the periphery of a work piece, for example an automobile door, so that a multiplicity of welding guns may be connected to the bus bars and utilized to make a multiplicity of spots around the periphery of the door. The bus bar assembly 23 will carry a multiplicity of terminal sets 24 at convenient points to which the welding guns may be connected.

Figure 5:
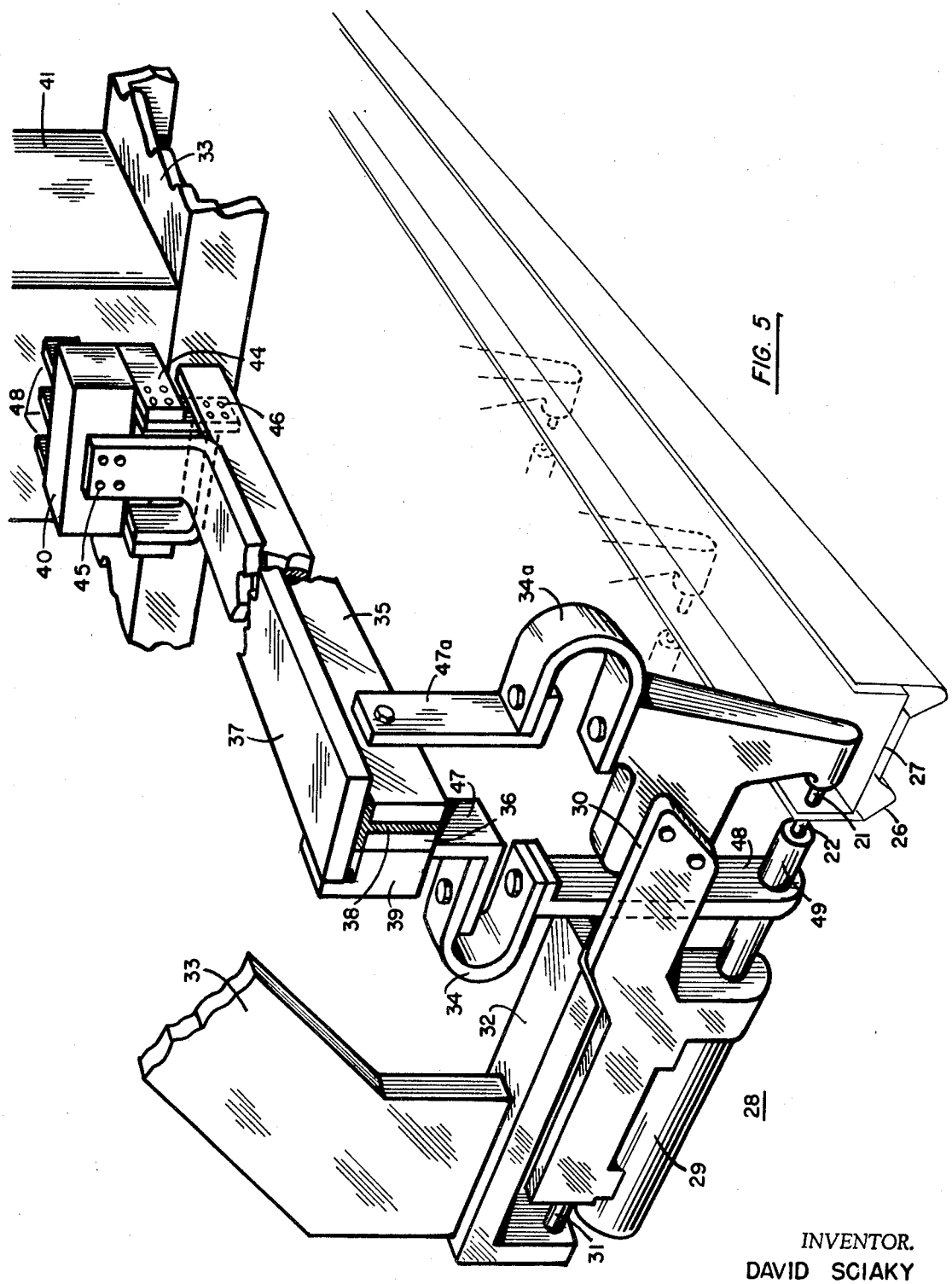
FIG. 5 is an illustration in perspective of a particular embodiment of a machine made in accordance with the present invention.

FIG. 5 is a physical embodiment of one form of the invention. The work pieces 26 and 27 are in the form of two channels which are to be welded together at a multiplicity of points along their vertical sides.

FIG. 5 is a perspective drawing of part of a machine showing a welding gun and few of the groups of electrodes, some in phantom, which are utilized to weld one of the vertical sides. A second group of guns and electrodes is interleaved between the first group in order to weld the second wall of the work pieces.

In accordance with the invention, three bus bars running parallel to one another but insulated from each other along their length, are utilized to carry the currents to the several guns. Bus bar 37 is connected at its one end to terminal 45 of the rectifier indicated as 40 on FIG. 5. A second terminal 44 of the rectifier is connected by conductor 46 to one end of bus bar 35. Bus bar 36 is connected to the end of bus bar 37 which is furthest from terminal 45 by means of connecting block 39. Each gun assembly 28 consists of a yoke 30 which carries a pneumatic or hydraulic pressure cylinder which moves the electrode holder 49 to and from the work pieces and provides the force between the electrodes 21 and 22 which are arranged on either side of the work at the point where the spot weld is desired. Conductor 48 is fixed to the electrode holder 49 and connections to the bus bars 35 and 36 are made by flexible conductors 34 and conductors 47 which are connected to the bus bars 35 and 36 at any convenient position along their length. The gun 28 is supported by means of a slideable shaft 31 so as to allow the yoke to position itself so that both tips 21 and 22 will make contact with the work. The rod 31 is supported by the bracket 32 which is fixed to the frame 33 of the machine. Transformer 41 is likewise fixed to the frame 33 of the machine and its low voltage windings connected by terminals 48 to the rectifier 40. During the welding operation current will pass from terminal 45 of the rectifier through the length of bus bar 37, through conducting block 39 to bus bar 36 through a portion of bus bar 36 to conductors 47 and 34 through conductor 48 and electrode holder 49 through the electrodes 21 and 22 and through the parts being welded, returning to bus bar 35 through conductors 34A and 47A passing along bus bar 35 through terminal 44 of the rectifier.

The advantage of using the structure of the present invention may best be illustrated from the results of tests made of gun currents obtained through the use of the structures of FIG. 3 in contrast to test results obtained when using the structures of FIGS. 1 and 2. With the configuration shown in FIG. 1 the current through the electrodes of the gun connected on the left side of the bus bars was 3,300 amperes with a percentage ripple of 43 percent. With the gun connected at the right hand side of the bus bars the current was 5,500 amperes with 96 percent ripple factor.

In a test performed utilizing the configuration of bus bars illustrated in FIG. 2, a welding gun connected between points A and $A^1$ was found to deliver 3,500 amperes at 50 percent ripple factor and the same gun connected between the points D and $D^1$ passed 4100 amperes at 80 percent ripple factor.

In contrast, in a test conducted utilizing the arrangement of bus bars and connections illustrated in FIG. 3, a welding current of 3,400 amperes at 52 percent ripple was measured with the gun connected between any of the sets of points $E\ E^1$, $F\ F^1$, $G\ G^1$, or $H\ H^1$.

Although FIG. 3 shows the bus bars 9, 10 and 11 essentially in one direction, equivalent results will be obtained if the three bus bars are formed around a cylindrical shape, or a hexagonal, or in a zig-zag fashion to cover not only a set of guns arranged along a line but many guns arranged to make a multiplicity of resistance welds over a large area.

The arrangement according to this invention also lends itself to the proper welding of a wide variety of metals which, because of differences in physical properties, are each welded best by a current of a particular wave shape. For example in the welding of aluminum, a single direct current pulse of current which rises exponentially to a maximum and then decays slowly to some lower level is required in order to obtain sound welds. On the other hand, in welding certain high heat resistant heat treatable metals as used in the aircraft industry a welding program such as described in U. S. Pat. No. 2,862,114 would be used. The new arrangement lends itself to the use of electronic controls by means of which the current through the work pieces may be made to rise to its maximum value at a desired rate and to follow a desired program of amplitude versus time. The inductance in the secondary current may easily be changed either by adjusting the distance between bus bars 11 and 9 of FIG. 3 or by placing different volumes of iron between these two conductors. Increasing the inductance either by increasing the distance between bus bars 11 and 9 or adding iron will decrease the rate of rise of the secondary current and conversely a decrease in distance will increase the rate of rise of secondary current.

The different volumes of iron utilized to obtain different values of inductance may be fastened to the bus bars 11 or 9 by means of bolts through the four holes shown on the right side of the bus bar. Increasing amounts of iron may be added until the desired increase in inductance is obtained as may be evidenced by observing the rate of rise of secondary current on an oscillograph.

The scope of the invention is not limited to the particular form shown in FIGS. 3 and 5 but to every modification of that form which will be apparent to the man of the art and which will produce like results.

What I claim is:

1. In a multi-gun resistance welding machine, a power supply having a set of input and a set of output terminals, a first bus bar connected at its one end to one of said set of output terminals, a second bus bar insulated electrically from and disposed in close proximity and parallel to the first said bus bar, a third bus bar, disposed parallel to but laterally positioned from the said first two bus bars, whose one end is connected by the shortest possible connection to that end of the second bus bar which is opposite the first mentioned end of the first bus bar and whose other end is connected to another one of said set of output terminals, pairs of terminal points arranged along the said first two bus bars each pair of said terminals consisting of a terminal point on the first bus bar and a terminal point on the second bus bar, said terminals in each of said pairs being arranged in closest proximity to one another, and means for connecting a welding gun to each of the said sets of terminals.

2. A resistance welding machine as in claim 1 in which the power supply delivers direct current derived by rectification of an alternating current source.

3. A resistance welding machine as in claim 1 in which the group of bus bars is contoured so as to conform to the outer peripheral shape of the work pieces to be welded.

4. A resistance welding machine as in claim 1 in which the distance of the said third bus bar from the first and second bus bars may be varied.

5. A resistance welding machine as in claim 1 in which the group of bus bars is contoured so as to surround the outer periphery of the work pieces to be welded in the plane passing through the electrodes of the aforesaid welding guns.

6. A resistance welding machine as in claim 1 in which variable volumes of iron are fastened to the said third bus bar.

* * * * *